United States Patent
Weigele et al.

[11] 3,798,695
[45] Mar. 26, 1974

[54] WASHING DEVICE FOR THROUGH-PASSING MOTOR VEHICLES

[76] Inventors: Gebhard Weigele, Bussardweg 3, 8900 Augsburg; Johann Sulzberger, Mozartstrasse, 8901 Steppach, both of Germany

[22] Filed: July 12, 1972

[21] Appl. No.: 271,122

[30] Foreign Application Priority Data
May 17, 1972  Germany............................ 2223994

[52] U.S. Cl. .............................. 15/21 E, 15/DIG. 2
[51] Int. Cl. ................................................ B60s 3/06
[58] Field of Search............. 15/DIG. 2, 21 D, 21 E, 15/97

[56] References Cited
UNITED STATES PATENTS
| | | | |
|---|---|---|---|
| 3,559,225 | 2/1971 | Gougoulas........................... | 15/21 E |
| 3,601,833 | 8/1971 | Takeuchi............................ | 15/21 E |
| 3,662,419 | 5/1972 | Dini..................................... | 15/21 E |

FOREIGN PATENTS OR APPLICATIONS
| | | | |
|---|---|---|---|
| 1,243,230 | 8/1971 | Great Britain................... | 15/DIG. 2 |

*Primary Examiner*—Edward L. Roberts
*Attorney, Agent, or Firm*—Woodhams, Blanchard and Flynn

[57] ABSTRACT

Washing device for motor vehicles. A bridge structure under which the motor vehicle passes during washing is provided by at least two crossbeams supported for moving together a limited distance in the direction of vehicle travel during the washing operation. Both crossbeams define a shallow inverted V-shape with the apex pointing in the direction of vehicle travel. A pair of first carriers are provided on the first crossbeam, each supporting a rotatable washing brush and each movable simultaneously and operatively toward and away from the center of the crossbeam. Driving means are provided for moving said brushes under positive driving simultaneously away from the center of the crossbeam and releasing same at points adjacent the ends of the crossbeam for resilient urging toward and eventual return to points adjacent the center of the crossbeam. A pair of second carriers is mounted for similar movement on the second crossbeam and each thereof also carries a rotatable washing brush. Means are provided on each of the said first carriers for moving the second carriers positively from points adjacent the center of the second crossbeam to the respective ends thereof and for then releasing same to return under resilient urging toward and eventually to points adjacent the center of the second crossbeam. Thus, the brush that will wash the front of a car as same moves from the center of the crossbeam to the ends thereof, will wash the sides of the car while being resiliently urged toward the centers of the crossbeam and will then wash the rear end of the car as same return under said resilient urging toward the center of the crossbeam. The inverted V-shape of the crossbeams provide an advancing movement of the brushes by which they follow the movement of the car while washing the rear end thereof but without requiring advancing movement of the crossbeams. Hence, it is only necessary for the crossbeams to move forwardly during the washing of the forward end of the vehicle and same can return to their initial position during washing of the sides of the vehicle and can remain at a standstill during washing of the rear end of the vehicle.

8 Claims, 11 Drawing Figures

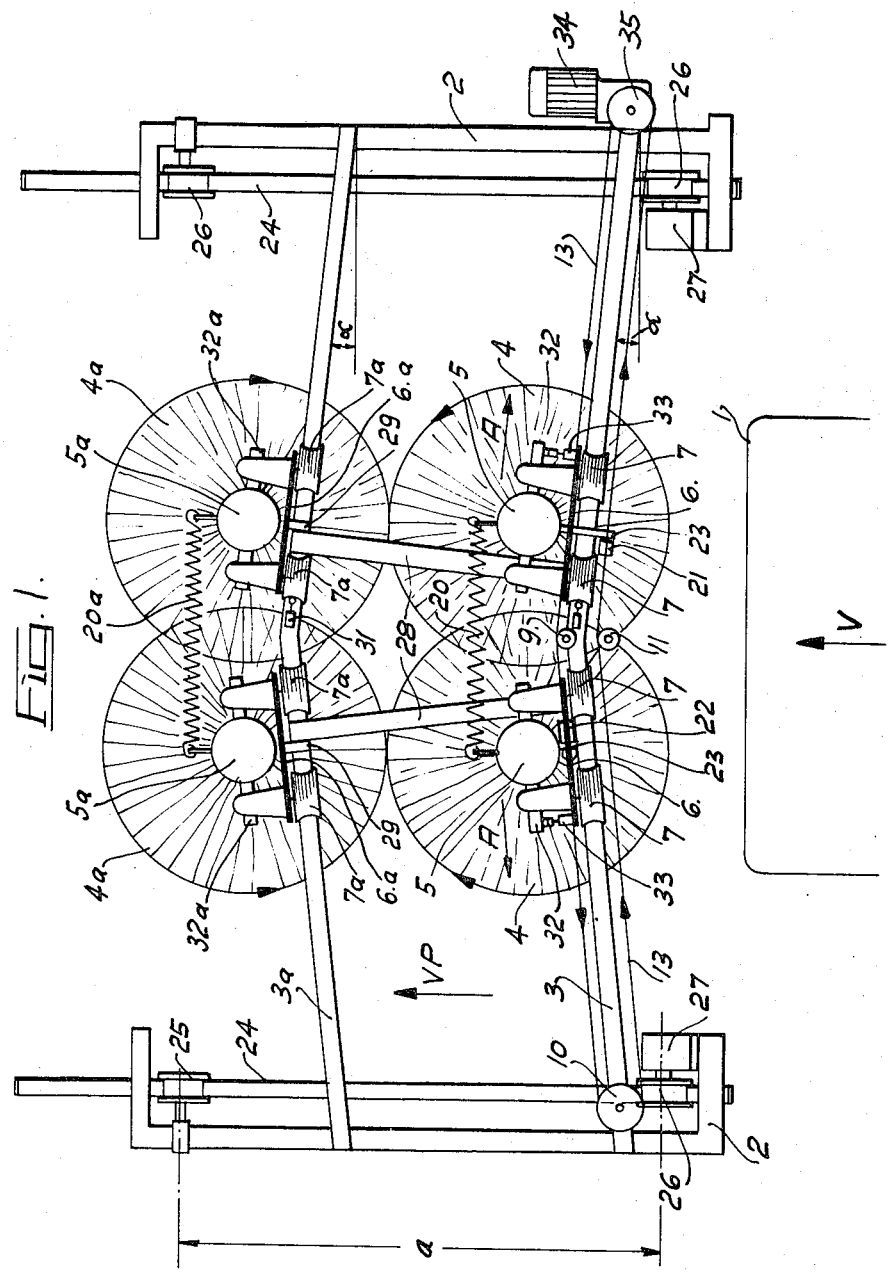

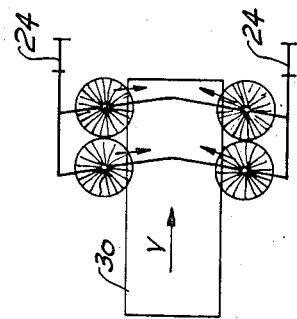
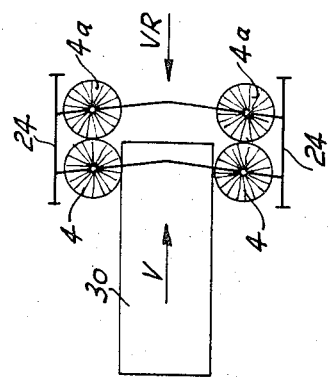
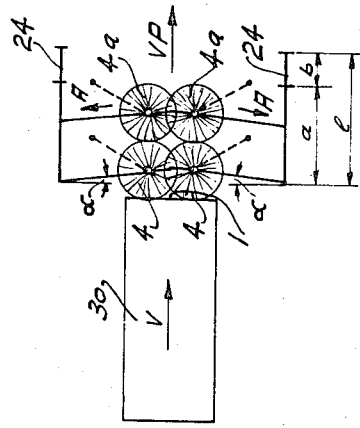
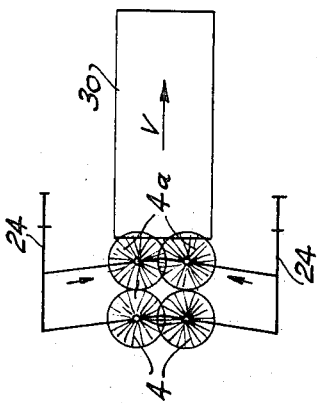
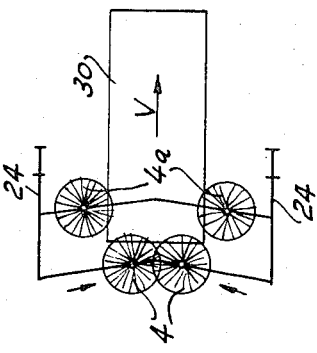

WASHING DEVICE FOR THROUGH-PASSING MOTOR VEHICLES

The invention relates to a washing device for vehicles passing therethrough, wherein there is provided a crossbeam which is moved back and forth on rails and on which two vertical washing brushes are supportingly suspended from suitable wheeled carriers. Said brushes during the forward movement of the crossbeam are moved outwardly for washing the front of the vehicle and are moved inwardly for washing the rear of the vehicle and said brushes during the front and rear washing operations move approximately at the speed of the vehicle in the advancing direction thereof.

In a known washing device of this type (Offenlegungsschrift No. 1 954 259 of the Applicant) three movements of the bridge carrying the crossbeam are required, namely, a forward movement for the front washing, thereafter during washing of the side surfaces of the vehicle a backward movement of the bridge for twice the length of the forward movement, and finally for washing the rear of the vehicle a second forward movement of the bridge until it reaches its initial position. Thus in this known washing device a relatively large movement of the bridge, or the crossbeam which carries the washing brushes, is required and there is further required a corresponding control of the three aforementioned movements.

The basic purpose of the present invention is to produce a washing device for through-passing motor vehicles of the type mentioned above, which makes possible a substantially shorter bridge movement and thus a shorter washing stall and which also makes possible a simplification of the control.

This purpose is attained according to the invention substantially by bending the crossbeam at its center in the feed direction so that the crossbeam halves are forwardly inclined at an acute angle with respect to the transverse direction. Furthermore, the crossbeam is moved forwardly only during the washing of the front of the vehicle. After the backward movement into the initial position it stands still during the washing of the rear of the vehicle.

In this new washing device, the distance moved by the crossbeam during its forward and backward movement is only approximately half of such distance needed by the known washing device. Further, the control is simplified because only two movements are required, namely, one forward movement of the crossbeam for washing the vehicle front and one backward movement of the crossbeam into its initial position in which — with the crossbeam standing — the washing of the rear takes place by the two washing brushes moving from outside to the inside and following the vehicle by reason of the inclined position of the crossbeam halves.

A further stationary washing device is known for through-passing motor vehicles, in which washing device there is provided a relatively long crossbeam which is arranged at an angle of approximately 45° with respect to the direction of movement of the vehicle and on which crossbeam are arranged the carriers of two vertical brushes. These two brushes move longitudinally on said crossbeam in such a manner that the one brush washes the vehicle front and one vehicle side, while the second brush washes the other vehicle side and the rear. A disadvantage of this stationary washing device is that it requires a very great distance between successive vehicles which not only results from the great length of the inclined crossbeam but also by the fact that after the rear is washed the two washing brushes must be returned into the initial position from the one crossbeam end to the other crossbeam end.

The invention will be discussed more in detail hereinafter in connection with exemplary embodiments which are illustrated in the drawings, in which:

FIG. 1 is a top schematic view of a washing device for through-passing motor vehicles;

FIGS. 2 to 6 are schematic illustrations of said washing device in various successive operating positions;

Figure 7:
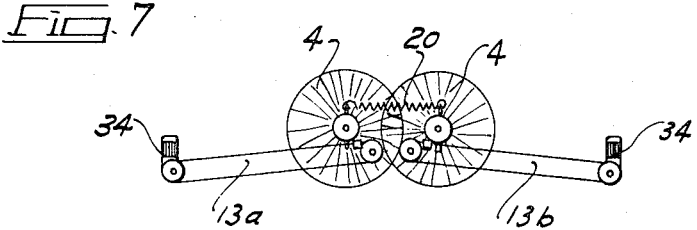
FIGS. 7 to 11 are schematic illustrations of washing devices of different constructions.

The number 1 in the drawing identifies the front of a motor vehicle which moves forward in the direction V at a steady speed, for example, by a conveyor belt. The washing device consists substantially of a bridge which has lateral supports 2 and a crossbeam 3 of special construction and two vertical washing brushes 4 which are driven by electric motors 5 to oppose at their adjacent edges the movement of the vehicle and are supportingly suspended each on a carrier 6. They have two rollers 7 with which said carriers can be moved in transverse direction on the crossbeam 3 which also forms a rail. Said two carriers 6 are connected for the counterdirectional and synchronous movement of same by an endless tow line 13 which is guided over guide rollers 9 to 12 and which is moved by a motor 34 over a drive roller 35.

The two carriers 6 are connected by a tension spring 20 and two driving lugs 21, 22 are secured on the tow line 13 to act against stop 23 on each carrier and effect travel of the carriers 6 only during the forward movement of the bridge in direction V and move same outwardly in direction A. The arrows on the tow line indicate the direction of movement of this tow line during the forward movement of the bridge.

The bridge can be moved on the longitudinal rails 24 by rollers 25, 26. A two-way drive of the rollers 26 is conveniently obtained by an electric motor 27 on each of rollers 26, said motors 27 being preferably reversible for effecting the forward and backward run.

A second crossbeam 3a is provided in the illustrated, advantageous exemplary embodiment. This also serves as a rail for two further carriers 6a and said carriers are also connected by a tension spring 20a. Two further vertical brushes 4a are supportingly suspended on said carriers. The carriers 6 are connected by a bar 28 respectively to each of the carriers 6a of the second washing brushes 4a so that during the movement of the first washing brushes 4 in direction A outwardly, the second washing brushes 4a are moved along synchronously, however, during the later movement of the first washing brushes 4 the brushes 4a are released. For this purpose each carrier 6a is provided with a stop 29 which is engaged by the bar 28 which is fixedly connected to the carrier 6. These carriers 6a are driven by their associated motors 5a in such a manner that these brushes themselves rotate — as indicated with arrows — counterdirectionally with respect to each other and furthermore counterdirectionally with respect to the respectively adjacent washing brushes 4.

Figure 11:
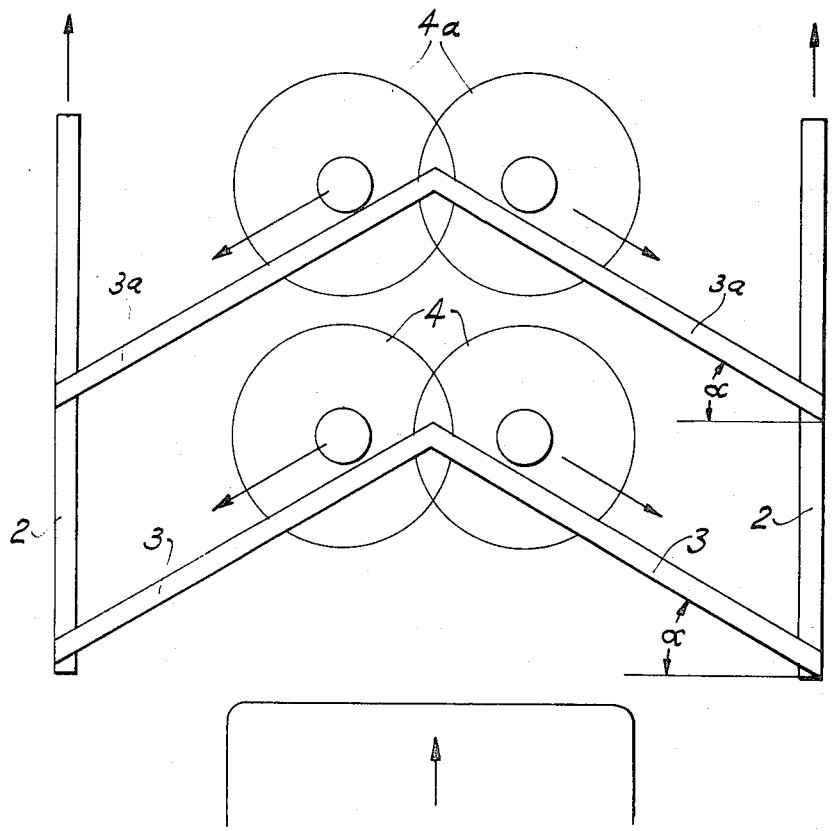

As can be seen from the drawing, the crossbeams 3 and 3a of the bridge are bent in the center in feed direction V in such a manner that the crossbeam halves are arranged in a forwardly inclined position at a small acute angle α with respect to the transverse direction. This angle is in the illustrated construction of FIG. 1 approximately 10° but it may also be larger as illustrated in FIG. 11. Through this bent construction of the rails 3 and 3a, the brushes which are moved inwardly by the springs 20, 20a during the washing of the rear of the motor vehicle follow the vehicle and thus a better, automatic cleaning of the rear is achieved.

The operation of the above-described washing device is illustrated in FIGS. 2 to 6. FIG. 2 illustrates the initial position of the bridge which is movable on the stationary rails 24 with respect to a through-passing motor vehicle 30. As soon as the front 1 of the vehicle contacts the first rotating brushes 4, the motors 27 for the forward movement of the bridge are energized. This energizing can be accomplished by electrical power measurement (active power appearing at the brush motors 5), or it may also be accomplished in any other convenient manner, such as by mechanical measurement (torque or rotational speed measurement of the brushes) or by distance measurement with tracer control. At the same time the motor 34 is also started and by actuation of the above-described tow line both the first brushes 4 and the second brushes 4a are moved outwardly in transverse direction A and the front of the motor vehicle is washed. In consideration of the inclined position of the two crossbeam halves 3 or 3a, the bridge feed VP which is effected by the motors 27 must be correspondingly greater than the speed of advancement of the motor vehicle.

After the front has been washed, the motor 34 returns the driving lugs 21 and 22 into their initial position so that the springs 20 and 20a can act on the brushes 4 and 4a to effect the side and rear washing according to FIGS. 3 and 4.

The motors 27 are reversed (advantageously by an adjustable time relay) and effect the backward movement VR of the bridge until finally, as shown in FIG. 4, the bridge returns to and stands into its initial position. However, the bridge may also be returned under power at a later point, such as when the vehicle doors have reached the brushes. In this manner, for example, the wheels receive a more intensive washing.

As soon as the rear of the motor vehicle reaches the first brushes 4 said brushes are, since the bridge which stands still — as is illustrated in FIG. 5 — moved inwardly and forwardly on the inclined forwardly directed rail halves 3 under the effect of the tension spring 20. Thus the rear of the motor vehicle is thoroughly washed because through the previously mentioned inclined position of the rail halves the brushes follow the continuing motion of the motor vehicle 30. The rear is then again washed in the same manner by the second brushes 4a as soon as the rear of the vehicle reaches them. After the rear washing is finished, the brushes, as shown in FIG. 6, have returned to their initial position so that the washing of the front of the following vehicle can start immediately. When the position according to FIG. 6 is achieved, a contact 31 can be operated, as through a carrier 6a of a second brush 4a, which contact stops the feed device for the motor vehicles for some seconds in order to still further improve the rear washing by the brushes 4a.

As illustrated in FIG. 1, each washing brush can advantageously be supported swingably about an axis 32 or 32a on the associated carrier transverse to the axis of rotation thereof and one emergency cutout 33 each can be provided which will be operated in case of an excessive pressure occurring between the brush and the vehicle, which pressure causes the washing brushes 4 to assume an inclined position which exceeds a predetermined limit.

It is further possible to provide in the aforementioned measurement of power supplied to the brushes a second power responsive device which stops the conveyor belt during the washing of the front if the contact pressure is too great. In this manner, it is possible to overcome greater unevennesses of a vehicle front.

According to FIGS. 1 and 2, the rollers 25, 26 of the bridge are spaced apart at a distance a. The bridge is moved forwardly only for the distance b for washing of the vehicle front. These two distances taken together determine a rail length l.

A further embodiment of a washing device, shown in FIG. 7, differs from the above-described embodiment primarily in that for each brush 4 there is provided a separate motor 34 which moves the associated brush outwardly by the separate tow lines 13a, 13b. In this embodiment each brush follows separately the contour of the vehicle so as to achieve a very effective washing of the front thereof, particularly in the case of vehicles of different widths.

Figure 8:
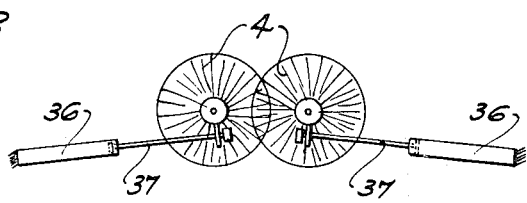

In the embodiment according to FIG. 8, air or hydraulic cylinders 36 are provided with the piston rods 37 by which each brush 4 is moved outwardly. In this embodiment and also in the further embodiments according to FIGS. 9 and 10 a tension spring 20 (compare FIG. 7) is also provided which urges the two brushes against the sides of the vehicle during washing of same or during the washing of the rear said spring 20 moves the two brushes on the bent crossbeam 3 again inwardly into the initial position.

Figure 9:
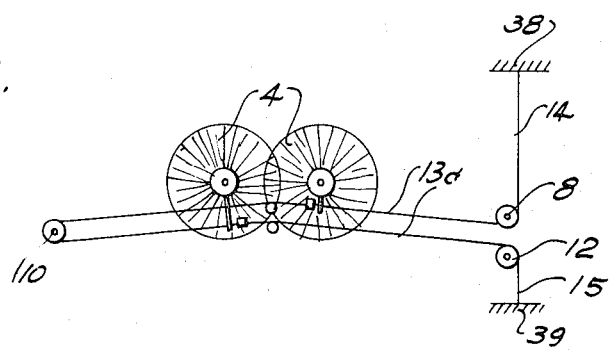
Figure 10:
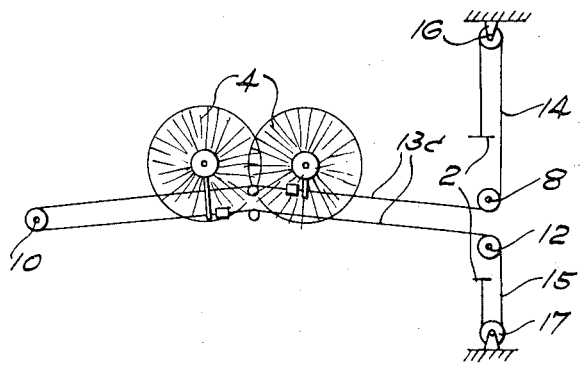

In the advantageous embodiment according to FIGS. 9 and 10, a tow line 13 is provided which is guided over guide rollers 8, 10, 12 and its ends 14, 15 are anchored at stationary points. Thus, during the forward movement of the crossbeam the two brushes 4 are moved automatically outwardly through said tow line 13c. In the embodiment illustrated in FIG. 9, the two tow line ends 14, 15 are secured on stationary points 38, 39. This effectively provides a translation ratio of 1:1 of forward movement of the crossbeam as related to outward movement of the brush.

In the embodiment according to FIG. 10, the two tow line ends 14, 15 are guided over two stationarily arranged guide rollers 16, 17 and are secured on the crossbeam or the support 2. Here there is provided a step-down ratio of 1:2, that is with respect to the forward movement of the crossbeam, the two brushes are moved outwardly at twice the speed of said forward movement during the front washing. This construction has the advantage of requiring little room.

FIG. 11 illustrates an embodiment in which the crossbeam halves 3 and 3a are arranged with a greater acute angle α. This results in a better washing of the rear because the brushes follow for the rear end of the vehicle for a correspondingly longer time. However, a larger return path of the bridge during the side washing must be accepted.

The embodiments of the invention in which exclusive property or privilege is claimed are defined as follows:

1. A washing device for forward moving motor vehicles, said washing device having means defining a crossbeam which is movably supported for back and forth movement on rails and two vertical washing brushes suspended therefrom on means defining wheeled carriers, driving means for effecting a movement of said brushes during a forward movement of said crossbeam outwardly across the front end of an oncoming vehicle for washing said front end of said vehicle and for moving said brushes inwardly across the rear end of an outgoing vehicle for washing said rear end of said vehicle, said driving means also effecting a movement, during said front end and rear end washing, of said brushes at approximately the speed of said forwardly moving vehicle, comprising the improvement wherein said crossbeam means is bent in the center so that the crossbeam halves defined thereby are inclined forwardly at an acute angle ($\alpha$) with respect to a direction transverse to the direction of movement of said vehicle, said driving means further effecting a forward movement of said crossbeam means and said brushes during the washing of said front end of said vehicle and a subsequent backward movement into the initial starting position during the washing of the sides and rear end of said vehicle.

2. A washing device according to claim 1, wherein said wheeled carrier means are connected by a tension spring;
   wherein said driving means includes a tow line having two driving tongues secured thereon and which engage said wheeled carrier means only during said forward movement of said crossbeam means to effect said outward movement of said brushes.

3. A washing device according to claim 1, including means defining a second crossbeam on which two further washing brushes are laterally movably suspended on means defining a second wheeled carrier, a bar connecting said first wheeled carrier means to said second wheeled carrier means in such a manner that during the outward movement of said first washing brushes, said second washing brushes are moved along synchronously however, during the movement of said first washing brushes inwardly, said second washing brushes are released from engagement with said bar.

4. A washing device according to claim 3, wherein said second washing brushes rotate in an opposite direction to said first mentioned washing brushes.

5. A washing device according to claim 1, wherein said first wheeled carrier means includes means defining guide rollers; and
   wherein said driving means comprises a tow line guided by said guide rollers and the two ends of said tow line are secured to stationary points whereby during the forward movement of said crossbeam means, said two brushes are moved automatically outwardly by said tow line.

6. A washing device according to claim 5, wherein said guide rollers are mounted on said crossbeam means; and
   wherein said two tow lines are guided over said two guide rollers, said crossbeam means being movable back and forth relative to said stationary points.

7. A washing device according to claim 1, wherein each washing brush is supported on said wheeled carrier means for pivotal movement about an axis transverse to the rotational axis of said brush and generally parallel to the direction of movement of said wheeled carrier means.

8. A washing device according to claim 7, including means defining an emergency cutout operable in case of an excessive inclined position of a washing brush.

* * * * *